United States Patent [19]

Schick et al.

[11] Patent Number: 4,853,289
[45] Date of Patent: Aug. 1, 1989

[54] MAGNETIC LACQUER DISPERSIONS, PROCESS FOR THEIR PRODUCTION AND THEIR USE

[75] Inventors: Peter Schick, Krefeld; Friedrich Jonas, Aachen; Lutz Leitner, Krefeld, all of Fed. Rep. of Germany

[73] Assignee: Bayer Aktiengesellschaft, Leverkusen, Fed. Rep. of Germany

[21] Appl. No.: 93,763

[22] Filed: Sep. 8, 1987

[30] Foreign Application Priority Data

Sep. 17, 1986 [DE] Fed. Rep. of Germany ....... 3631537

[51] Int. Cl.⁴ ................................................ G11B 5/64
[52] U.S. Cl. ................................ 428/408; 252/62.54; 427/128; 428/694; 428/695; 428/900
[58] Field of Search ............... 428/408, 695, 694, 900; 252/62.54; 360/134–136; 427/128, 131

[56] References Cited

U.S. PATENT DOCUMENTS

| | | | |
|---|---|---|---|
| 4,444,838 | 4/1984 | Yamada | 428/336 |
| 4,562,117 | 12/1985 | Kikukawa | 427/128 |
| 4,690,863 | 9/1987 | Miyoshi | 428/694 |
| 4,699,817 | 10/1987 | Fujiki | 428/695 |
| 4,708,909 | 11/1987 | Ohtsuki | 428/425.9 |
| 4,713,293 | 12/1987 | Asano | 428/425.9 |

*Primary Examiner*—Paul J. Thibodeau
*Attorney, Agent, or Firm*—Connolly & Hutz

[57] ABSTRACT

An improved magnetic dispersion for magnetic recording which comprises magnetic pigment, abrasive, carbon black or another additive for regulating conductivity, binder, solvent, lubricant, and wetting agent, wherein the improvement comprises quantities of wetting agent, lubricant, or both being between at least 100 to 140% of the individually determined saturation adsorptions of the wetting agent and lubricant, with the proviso that the minimum quantity of wetting agent or lubricant is 80% of the individually determined saturation adsorption.

11 Claims, No Drawings

MAGNETIC LACQUER DISPERSIONS, PROCESS FOR THEIR PRODUCTION AND THEIR USE

This invention relates to magnetic lacquer dispersions, to processes for their production and to their use for the production of magnetic recording supports.

BACKGROUND OF THE INVENTION

Magnetic lacquer dispersions generally consist of one or more magnetic pigments, abrasive (for example chromium oxide, $Cr_2O_3$) and carbon black for regulating the surface conductivity of the magnetic recording materials produced using these magnetic lacquer dispersions. These solids are normally dispersed in a polymer binder in organic solvents using phospholipids as wetting agents and long-chain, saturated carboxylic acids as lubricants.

To produce magnetic lacquer dispersions by the batch process, the above-mentioned constituents are normally predispersed in a first step, for example using a laboratory dissolver or a toothed colloid mill, and then in a second step are dispersed in a non-continuous or continuous bead mill.

Magnetic lacquer dispersions may also be produced by two-stage processes which differ from the batch process described above in that parts of the liquid constituents and of the binder are added in a third process step known as "Auflackung"=(let down). The rest of the material to be ground is predispersed, as in the batch process, and then ground in a bead mill of suitable construction.

The magnetic lacquer dispersion thus obtained is used to coat carrier films from which magnetic recording supports for various applications are made. The quality of the magnetic lacquer dispersions produced in this way is critically determined by the type, quantity and method of incorporation of the wetting agents and lubricants in the dispersion.

The use of lecithins are wetting agents and carboxylic acids as lubricants in the production of magnetic lacquer dispersions is known from the literature, cf. for example JP-A No. 57-200 934 and JP-A No. 60-007 612. However, the magnetic lacquer dispersions thus obtained are not suitable for the production of magnetic recording supports having optimal properties.

Accordingly, the object of the present invention is to provide magnetic lacquer dispersions which do not have any of these disadvantages.

BRIEF DESCRIPTION OF THE INVENTION

Magnetic lacquer dispersions such as these have now surprisingly been found and are the subject of the present invention. They are magnetic lacquer dispersions for magnetic recording supports which contain magnetic pigment, abrasive, carbon black or another additive for regulating conductivity, binder, solvent, lubricant, wetting agent and, optionally, crosslinking agent for the binder, wherein the respective quantities of wetting agent and/or lubricant used is between at least 100 and 140% of the individually determined saturation adsorptions of the wetting agent and the lubricant, although the minimum quantity of wetting agent and/or lubricant is 80% of the individually determined saturation adsorptions. Quantities larger than 140% have been found to produce disadvantages.

DETAILED DESCRIPTION

In the magnetic lacquer dispersions according to the invention, the lubricant and the wetting agent act synergistically.

The saturation adsorption of lauric acid, for example, as lubricant on the magnetic pigment used in n-heptane is determined as follows:

Dissolve 8.0 g lauric acid in 500 g n-heptane. Add 100 g pigment and disperse for 20 minutes using an Ultraturrax. Then treat for 2 hours in an ultrasonic bath and stir for 5 hours at room temperature. The solution is made up to the original quantity with n-heptane. After 24 hours about 50 ml of the supernatant clear solution are removed by pipette and weighed out (X . g). After adding 2 drops phenolphthalein solution, titrate with ethanolic KOH until the color changes from colorless to pink (V ml). Calculation of the lauric acid adsorbed:

$$8 - \frac{V \times 0.02 \times 508}{X} = \text{g lauric acid ads.}/100 \text{ g pigment}$$

The saturation adsorption of lecithin onto the magnetic pigment is determined as follows:

Dissolve 8.0 g lecithin in 500 g n-heptane, add 100 g pigment and disperse for 20 minutes using an Ultraturrax. Then treat for 2 hours in an ultrasonic bath and stir for 5 hours at room temperature. The solution is made up to the original quantity with n-heptane. After 24 hours about 100 ml of the supernatant clear solution are transferred by pipette to a weighed 250 ml spherical flask and the weight of the solution determined (X g). The solvent is removed in a water jet vacuum in a rotary evaporator, after which the flask is dried for 2 h at 70° C. After cooling to room temperature, the lecithin is weighed out (L g). Calculation of the lecithin adsorbed:

$$8 - \frac{L \times 508}{X} = \text{g lecithin ads.}/100 \text{ g pigment}$$

The quantities of wetting agent and lubricant indicated above are the minimum quantities required for the production of magnetic recording supports, an excess of up to 40%, based on these calculated quantities, being preferred. Magnetic recording supports having optimal properties are obtained with excesses of from 20 to 30%, based on the quantities determined with the adsorption isotherms.

Preferred magnetic lacquer dispersions according to the invention are those in which the lubricant is formed by one or more long-chain carboxylic acids and the wetting agent by one or more phospholipids.

Pure lecithin having a phospholipid content of at least 80% is particularly preferred as wetting agent. Saturated carboxylic acids, particularly linear monocarboxylic acids, containing from 6 to 30 carbon atoms are particularly suitable as lubricant.

Suitable saturated carboxylic acids include caproic acid, caprylic acid, capric acid, lauric acid, myristic acid, palmitic acid, stearic acid, oleic acid, linoleic acid, linolenic acid, cyclohexancarboxylic acid, and so forth.

The present invention also relates to processes for producing the magnetic lacquer dispersions according to the invention. They may be prepared from the particular magnetic pigment, abrasive, carbon black or any other additive for regulating conductivity, binder, solvent, lubricant, wetting agent and, optionally, crosslinking agent for the binder, the wetting agent and/or the lubricant each being used in a quantity of from 100 to 140% of the individually determined saturation adsorption of the wetting agent and the lubricant, although the minimum quantity of wetting agent and/or lubricant is 80% of the individually determined saturation adsorptions. Magnetic pigments such as, for example, $\gamma$-iron oxides, cobalt-doped iron oxides, iron oxides epitaxially coated with cobalt, magnetites, chromium dioxide, barium ferrite, and metal pigments may be used for producing the magnetic lacquer dispersions according to the invention. The binders used for producing the finely divided magnetic lacquer dispersions are polyurethane elastomers or the corresponding polyurethane-forming compounds, polyvinyl alcohols, polyvinyl chlorides, nitrocelluloses, epoxy resins, polyisocyanates, polyhydroxy compounds of relatively high molecular weight, copolyamides, polyvinyl formals, phenoxy resins, polyester resins and mixtures of these polymers or prepolymers.

The following classes of compounds may be used as solvents for the above-mentioned binders or binder mixtures, depending on their solubility: cyclohexanone, ketones, tetrahydrofurane, xylenes, toluenes, esters or other suitable solvents or combinations of these solvents.

One or more long-chain carboxylic acids is/are used as lubricant and one or more phospholipids as wetting agent.

Pure lecithin having a phospholipid content of at least 80% is preferably used as the wetting agent.

Other phospholipids, such as for example cephalins, or synthetic products may also be used as lecithins, the quantity in which they are used also being optimized by the process according to the invention.

In one preferred embodiment of the process according to the invention, one or more saturated carboxylic acids, particularly linear monocarboxylic acids, containing from 6 to 30 carbon atoms, such as for example lauric acid or stearic acid, is/are used as lubricant.

It has been found that optimal magnetic lacquer dispersions are obtained when the entire determined quantity of wetting agent and lubricant is dissolved in the quantity of binder solution intended for the grinding batch, so that it is fully available for the grinding process.

The present invention also relates to the use of the magnetic lacquer dispersions for the production of magnetic recording supports.

The following examples are intended to illustrate the invention without limiting it in any way.

EXAMPLES

TABLE 1

Adsorbed quantities of lauric acid and lecithin (1 = stearic acid) individually determined as described above:

| Pigment no. | Lauric acid g | Lecitin g |
|---|---|---|
| 1 | 3.2 | 3.2 |
| 2 | 4.4 | 5.4 |

TABLE 1-continued

Adsorbed quantities of lauric acid and lecithin (1 = stearic acid) individually determined as described above:

| Pigment no. | Lauric acid g | Lecitin g |
|---|---|---|
| 3 | 3.2 | 4.2 |
| 1 | 4.5[1] | 3.2 |

TABLE 2

Description of the magnetic iron oxides (pigments) epitaxially coated with cobalt used in the Examples

|  | Pigment 1 | Pigment 2 | Pigment 3 |
|---|---|---|---|
| Particle length ($\mu$m) | 0.3 | 0.25 | 0.3 |
| aspect - ratio | 10:1 | 8:1 | 10:1 |
| BET surface (m$^2$/g) | 27 | 39 | 29 |
| Oil absorption (g/100 g) DIN | 42 | 47 | 41 |
| Coercive force (KA/m) | 50.8 | 50.2 | 49.4 |

The formulations shown in Table 3, Examples 1 to 16, are prepared as follows:

The binder solution is prepared by stirring the binders indicated in the solvents. The solution obtained is filtered, after which lauric acid and pure lecithin are added. The mixture is then stirred until a clear solution is obtained. The pigments are then added. The mixture is then predispersed for about 30 minutes in a dissolver, followed by dispersion for 3 h in a bead mill filled with 1 mm glass beads. The isocyanate is introduced into the bead mill 15 minutes before the end of the dispersion process.

The lacquer is filtered immediately after the end of dispersion and immediately further processed into a tape. The tape is calendered and then tempered on completion of the crosslinking reaction.

Table 4 shows the videoelectrical properties and still times of the VHS tapes produced therefrom. According to the invention, Formulation Examples 2, 7, 8, 13 nd 16 give inadequate tape results because the quantities of lauric acid and lecithin were not initially introduced in accordance with the invention. All the other Formulation Examples were treated with lubricant and wetting agent in accordance with the invention and, accordingly, lead to good magnetic tapes.

In Table 4, Example 14, lauric acid and lecithin were used in exactly the quantities analytically determined for pigment no 3 (cf. Table 1). The magnetic tape produced therefrom had good mechanical and videoelectrical properties. The quantities of lauric acid and lecithin indicated are equated with 100% for the following consideration.

125% lauric acid and 120% lecithin were used in Example 15. The magnetic tape produced therefrom also had good mechanical and videoelectrical properties.

Only 63% of the determined quantity of lauric acid and 48% of the lecithin were used in Example 13. 188% lauric acid and 190% lecithin were used in Example 16. Both formulations lead to magnetic tapes having inadequate properties.

TABLE 3

| Example no. | Formulation Examples (quantities in % by weight) | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Morthane CA 128[2] | 6.20 | 6.20 | 6.20 | 6.20 | 6.10 | 6.07 | 6.70 | 6.84 | 6.75 | 4.75 | 5.05 | 6.10 | 6.25 | 6.2 | 6.2 | 6.1 |
| Phenoxy PKKH[3] | — | — | — | — | — | — | — | — | — | 1.10 | 2.45 | — | — | — | — | — |
| Lauric acid | 1.00 | 1.00 | 1.20 | 1.26 | 1.49 | 1.53 | 0.61 | 0.77 | 0.94 | 1.00 | 1.00 | 1.49[1] | 0.5 | 0.8 | 1.0 | 1.45 |

TABLE 3-continued

| Example no. | \multicolumn{16}{c}{Formulation Examples (quantities in % by weight)} |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pure lecithin | 1.00 | 1.00 | 1.30 | 1.34 | 1.61 | 1.70 | 0.99 | 0.99 | 0.99 | 1.05 | 1.10 | 0.99 | 0.5 | 1.05 | 1.25 | 2.0 |
| Chromium oxide GN-M[4] | 0.7 | 0.7 | 0.7 | 0.7 | 0.7 | 0.7 | 0.8 | 0.8 | 0.8 | 0.7 | 0.7 | 0.7 | 0.7 | 0.7 | 0.7 | 0.7 |
| Black pearls 2000[5] | 0.7 | 0.7 | 0.7 | 0.7 | 0.7 | 0.7 | 0.8 | 0.8 | 0.8 | 0.7 | 0.7 | 0.7 | 0.7 | 0.7 | 0.7 | 0.7 |
| Pigment no. 1[4] | 24.9 | — | — | — | — | — | 24.4 | 24.3 | 24.3 | — | — | 24.8 | — | — | — | — |
| Pigment no. 2[4] | — | 24.9 | 24.8 | 24.8 | 24.6 | 24.6 | — | — | — | — | — | — | — | — | — | — |
| Pigment no. 3[4] | — | — | — | — | — | — | — | — | — | 25.0 | 26.4 | — | 25.25 | 25.05 | 24.9 | 24.6 |
| Cyclohexanone | 21.4 | 21.4 | 21.2 | 21.2 | 21.1 | 21.0 | 22.2 | 22.1 | 23.1 | 21.4 | 19.4 | 21.3 | 21.75 | 21.5 | 21.45 | 21.2 |
| MEK | 42.7 | 42.7 | 42.5 | 42.4 | 42.3 | 42.3 | 41.5 | 41.4 | 41.3 | 42.9 | 41.8 | 42.5 | 42.95 | 42.6 | 42.4 | 41.9 |
| Desmodur L 75[4] | 1.4 | 1.4 | 1.4 | 1.4 | 1.4 | 1.4 | 2.0 | 2.0 | 2.0 | 1.4 | 1.4 | 1.4 | 1.4 | 1.4 | 1.4 | 1.35 |

[1]Stearic acid
[2]Morton Chemical Company, Chicago, Ill., USA
[3]Union Carbide Corp., Danbury, CT., USA
[4]Products of BAYER AG
[5]Cabot Corp., Boston, MA., USA

TABLE 4

Video data of the Examples in Table 3 as measured in accordance with the VHS specification at the working point of the reference tape TDK SA HS E 180 in dB relative to that standard

| Example no. | 1 | 2** | 3 | 4 | 5 | 6 | 7* | 8* | 9 | 10 | 11 | 12 | 13** | 14 | 15 | 16* |
|---|---|---|---|---|---|---|---|---|---|---|---|---|---|---|---|---|
| Ny | +0.9 | — | +0.5 | +1.2 | +1.0 | +0.9 | +0.4 | +0.5 | +0.1 | +1.3 | +0.8 | +0.2 | — | +1.3 | +1.6 | +0.8 |
| Nc | +0.5 | — | −0.4 | −0.2 | −0.6 | −1.0 | −0.6 | −0.4 | −0.6 | +0.1 | −0.1 | −0.4 | — | +0.2 | +0.3 | −0.2 |
| OWC | −0.5 | — | ±0 | +0.2 | −0.2 | −0.2 | +0.2 | +0.2 | +0.2 | −0.1 | +0.2 | 0 | +0.2 | — | 0 | −0.2 | −0.2 |
| Ey | +0.9 | — | −0.1 | +0.1 | 0 | +0.4 | +0.6 | +0.4 | +0.1 | +0.7 | +0.6 | +0.3 | — | +1.1 | +1.5 | +0.6 |
| Ec | +0.7 | — | −1.2 | −1.8 | −1.8 | −1.2 | +0.2 | +0.2 | +0.4 | +0.1 | +0.4 | +0.1 | — | +0.1 | +0.6 | 0 |
| Still frame | >60' | — | >60' | >60' | >60' | >60' | — | — | >60' | >60' | >60' | >60' | — | >60' | >60' | — |
| Lauric acid | 4.0 | 4.0 | 4.7 | 5.1 | 5.9 | 6.2 | 2.5 | 3.2 | 3.9 | 4.0 | 3.8 | 6.0[1] | 2.0 | 3.2 | 4.0 | 6.0 |
| Lecithin | 4.0 | 4.0 | 5.4 | 5.5 | 6.5 | 6.9 | 4.1 | 4.1 | 4.1 | 4.2 | 4.2 | 4.0 | 2.0 | 4.2 | 5.0 | 8.0 |
| Pigment no. | 1 | 2 | 2 | 2 | 2 | 2 | 1 | 1 | 1 | 3 | 3 | 1 | 3 | 3 | 3 | 3 |

*Tape does not run, smears
**Tape no longer measurable, smears
Ey: Luminance sensitivity at 4 MHz
Ec: Chroma (color) sensitivity with standard blue area at OWC of reference tape
OWC: Optimal head current at sensitivity maximum at 4 MHz
Ny: Luminance noise for 100% image white with filter: high pass 1 kHz / low pass 500 kHz
Nc: Chroma (color) noise for standard red area with filter: high pass 1 kHz / low pass 500 kHz
The indicated quantities of lauric acid (1 = stearic acid) and lecithin in g are based on 100 g magnetic pigment.

What is claimed is:

1. A magnetic lacquer dispersion for magnetic recording supports, consisting of magnetic pigment, abrasive, carbon black or another additive for regulating conductivity, binder, solvent, lubricant, and wetting agent, characterized in that the respective quantities of wetting agent and lubricant is between at least 100 and 140 of the individually determined saturation adsorptions of the wetting agent and lubricant, based on 100 grams of magnetic pigment.

2. Magnetic lacquer dispersions as claimed in claim 1 wherein the lubricant is one or more long-chain carboxylic acids and the wetting agent is one or more phospholipids.

3. Magnetic lacquer dispersions as claimed in claim 1 wherein the wetting agent is lecithin having a phospholipid content of at least 80%.

4. Magnetic lacquer dispersions as claimed in claim 1 wherein the lubricant is one or more saturated carboxylic acids containing from 6 to 30 carbon atoms.

5. Magnetic lacquer dispersions as claimed in claim 4 wherein the saturated carboxylic acids are linear monocarboxylic acids.

6. Magnetic recording media comprising a flexible support member coated with the magnetic lacquer dispersion according to claim 1.

7. A magnetic lacquer dispersion as claimed in claim 1, further comprising a cross-linking agent for the binder.

8. A magnetic lacquer dispersion as claimed in claim 2, further comprising a cross-linking agent for the binder.

9. A magnetic lacquer dispersion as claimed in claim 3, further comprising a cross-linking agent for the binder.

10. A magnetic lacquer dispersion as claimed in claim 4, further comprising a cross-linking agent for the binder.

11. A magnetic lacquer dispersion as claimed in claim 5, further comprising a cross-linking agent for the binder.

* * * * *